(12) United States Patent
Kallenbach et al.

(10) Patent No.: US 7,180,055 B1
(45) Date of Patent: Feb. 20, 2007

(54) NUCLEAR SENSOR SIGNAL PROCESSING CIRCUIT

(75) Inventors: Gene A. Kallenbach, Bosque Farms, NM (US); Frank T. Noda, Albuquerque, NM (US); Dean J. Mitchell, Tijeras, NM (US); Joshua L. Etzkin, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 11/199,893

(22) Filed: Aug. 9, 2005

(51) Int. Cl.
*G12B 13/00* (2006.01)

(52) U.S. Cl. ............................................. 250/252.1

(58) Field of Classification Search ............. 250/252.1
See application file for complete search history.

(56) References Cited

U.S. PATENT DOCUMENTS

| | | | |
|---|---|---|---|
| 4,968,889 A | * | 11/1990 | Hartwell et al. ......... 250/336.1 |
| 6,194,715 B1 | * | 2/2001 | Lingren et al. .......... 250/252.1 |
| 6,291,825 B1 | * | 9/2001 | Scharf et al. ............. 250/369 |
| 6,781,134 B1 | | 8/2004 | Murray et al. |
| 6,836,523 B2 | * | 12/2004 | Izumi et al. .............. 376/255 |

* cited by examiner

*Primary Examiner*—David Porta
*Assistant Examiner*—Mark R. Gaworecki
(74) *Attorney, Agent, or Firm*—Carol I. Ashby

(57) ABSTRACT

An apparatus and method are disclosed for a compact and temperature-insensitive nuclear sensor that can be calibrated with a non-hazardous radioactive sample. The nuclear sensor includes a gamma ray sensor that generates tail pulses from radioactive samples. An analog conditioning circuit conditions the tail-pulse signals from the gamma ray sensor, and a tail-pulse simulator circuit generates a plurality of simulated tail-pulse signals. A computer system processes the tail pulses from the gamma ray sensor and the simulated tail pulses from the tail-pulse simulator circuit. The nuclear sensor is calibrated under the control of the computer. The offset is adjusted using the simulated tail pulses. Since the offset is set to zero or near zero, the sensor gain can be adjusted with a non-hazardous radioactive source such as, for example, naturally occurring radiation and potassium chloride.

12 Claims, 3 Drawing Sheets

NUCLEAR SENSOR SIGNAL PROCESSING CIRCUIT

STATEMENT OF GOVERNMENT INTEREST

This invention was made with Government support under Contract No. DE-AC04-94AL85000 awarded by the U.S. Department of Energy to Sandia Corporation. The Government has certain rights in the invention.

BACKGROUND OF THE INVENTION

The present invention relates to nuclear sensors for sensing gamma rays, and more specifically to a signal processing circuit for a gamma ray sensor that provides improved performance and simplified calibration.

Conventional gamma ray sensors utilize signal processing and energy calibration. The calibration of these devices typically requires a radiation source that is regulated by the Department of Transportation (DOT), and DOT considers these radiation sources as hazardous. An example of such a sensor is a high-purity germanium detector. Such detectors, however, require in-field calibration with radiation sources to ensure accurate readings. This calibration is extremely cumbersome and relatively dangerous, and it frequently requires governmental licensing. Moreover, high-purity germanium detectors must be cooled to liquid-nitrogen temperatures, and they are relatively fragile. These detectors are relatively bulky, they have difficulty operating over a wide temperature range, and they require relatively high power sources.

U.S. Pat. No. 6,781,134 discloses a handheld cadmium zinc telluride (CZT) radiation detector. The portable radiation detector implements a fuzzy-logic radioisotope identification procedure adapted for in-field analysis. The handheld CZT radiation detector includes a coplanar grid CZT gamma ray sensor. Unlike high-purity germanium detectors, the CZT radiation detector does not require in-field calibration or cooling to liquid-nitrogen temperatures. The CZT detector, however, is temperature sensitive, and it cannot operate over a wide temperature range.

There is a need for an easily calibrated nuclear sensor with a nuclear sensor signal processing circuit that is capable of operating over a relatively wide temperature range for use in a nuclear sensor that is both compact and uses relatively low power sources.

SUMMARY OF THE INVENTION

The present invention comprises a relatively compact and temperature insensitive nuclear sensor that can be calibrated with a non-hazardous radioactive sample. The nuclear sensor includes a gamma ray sensor that generates tail pulses. An analog conditioning circuit conditions the tail-pulse signals from the gamma ray sensor, and a tail-pulse simulator circuit generates a plurality of simulated tail-pulse signals. A computer system processes the tail pulses from the gamma ray sensor and the simulated tail pulses from the tail-pulse simulator circuit. The nuclear sensor is calibrated under the control of the computer. The offset is adjusted to zero or near zero using the simulated tail pulses. Since the offset is adjusted to zero or near zero, the gain of the nuclear sensor can be adjusted with a non-hazardous nuclear sample such as, for example, naturally occurring radiation or potassium chloride.

BRIEF DESCRIPTION OF THE DRAWINGS

The accompanying drawings, which are incorporated in and form part of the specification, illustrate some embodiments of the present invention and, together with the description, serve to explain the principles of the invention.

DETAILED DESCRIPTION OF THE INVENTION

The signal processing circuit of the present invention is designed to digitize pulses from gamma ray sensors. An important feature of the present invention is that it provides offset stabilization, which enables a novel method of energy calibration that does not require the use of any radiation sources regulated as hazardous by the Department of Transportation (DOT). A computer is used to generate histograms of the pulse heights.

Figure 1:
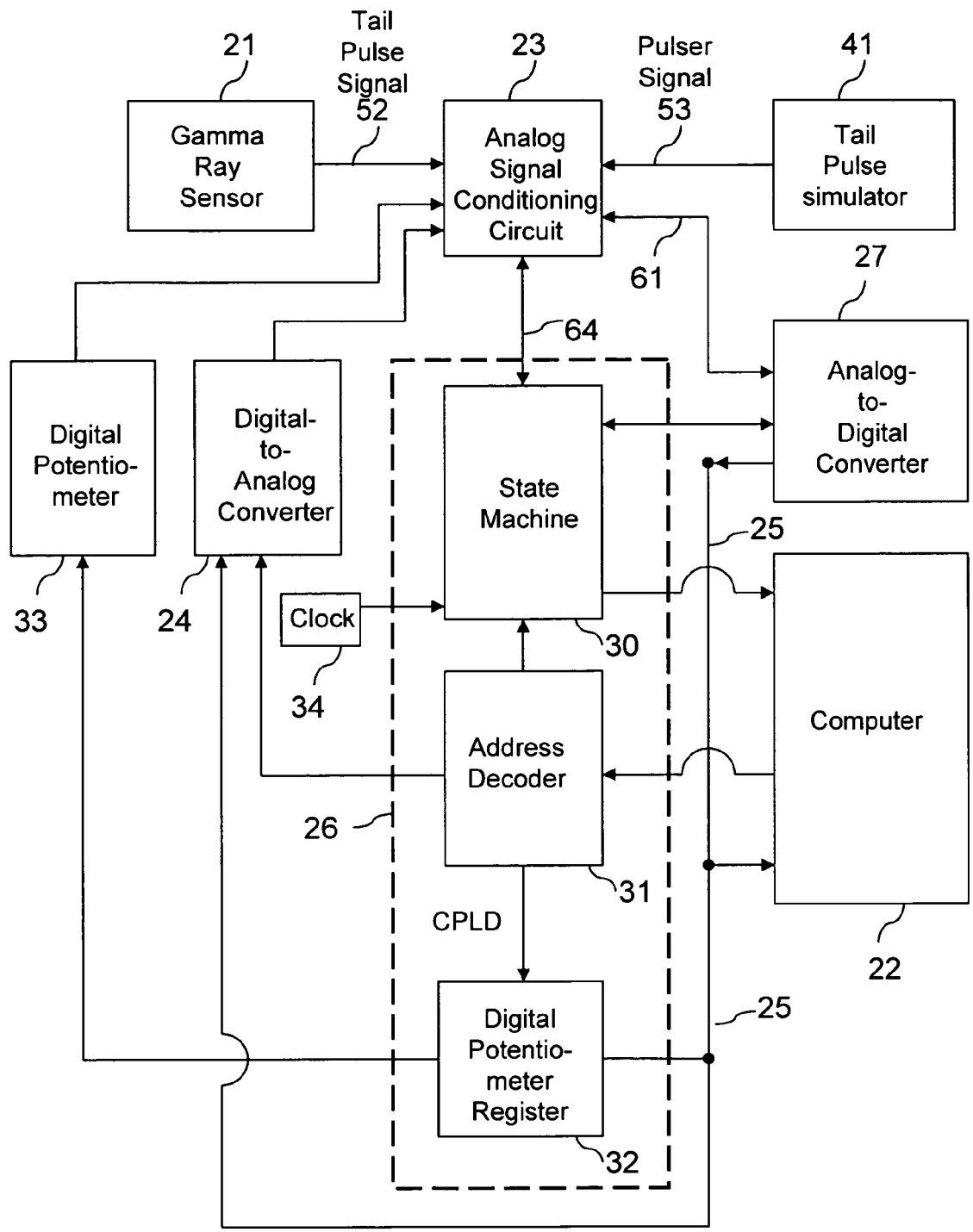
FIG. 1 comprises a block diagram of the components of the present invention.

FIG. 1 is a block diagram illustrating a nuclear sensor that employs the novel signal processing circuit of the present invention. The nuclear sensor of FIG. 1 includes a gamma ray sensor 21 which generates signals in response to gamma radiation that are applied to an analog signal conditioning circuit 23. The analog signal conditioning circuit 23 also receives analog signals from various devices including a tail-pulse simulator 41 and a digital-to-analog converter 24 which is coupled to the computer 22 via a data bus 25. The analog signal conditioning circuit 23 conditions analog signals, as described below, and these signals are applied to an analog-to-digital converter 27 and a CPLD (Complex Programmable Logic Device) 26. The CPLD 26 comprises a state machine 30, an address decoder 31, and a digital potentiometer register 32. The digital potentiometer register 32 controls a digital potentiometer 33. The state machine 30 is responsive to a clock 34. In some embodiments, the clock is an 8 MHz clock.

The analog-to-digital converter 27 receives from the analog conditioning circuit 23 an input signal which is digitized and applied to the data bus 25. The digital-to-analog converter 24 is also connected to the data bus 25 and converts outputs signals from the computer 22 to an analog form, and the analog signals are applied to the analog conditioning circuit 23.

The nuclear sensor of FIG. 1 can be can be divided into three functional blocks—an Analog Signal Processor (ASP), an analog to digital converter (ADC) block, and a Digital Control Interface (DCI). The ASP block, which primarily includes the analog conditioning circuit 23, uses bipolar signal processing. Bipolar signal processing reduces integration error compared to that with unipolar processing while not requiring complex circuitry. The ASP block first converts the signal from the gamma ray sensor 21 into a form from which the pulse area can be determined. The signal is then digitized in the ADC block, which includes the A/D converter 27, and the signal is passed to the computer 22. The DCI block is a state machine implemented on the Complex Programmable Logic Device (CPLD) 26. This block monitors the signals coming into the circuit and initiates actions based on those signals. When a pulse is detected, the Digital Control Interface block determines if the signal is from a single gamma ray or multiple gamma rays. If a single ray was detected, the pulse area is digitized and the computer 22 is notified that a datum is ready to be read. A counter keeps track of the total number of signals received versus the number processed, thereby allowing the total dead time to be closely estimated. The dead time is the minimum time separation between signals a system requires in order to process them. A signal that arrives faster than this time will not be processed so the system appears to be "dead" during this time. Knowing the dead time allows an accurate estimate of the total number of gamma rays that would have been processed in an ideal (zero dead time) system versus the number that have been received by the system under consideration.

Figure 2:
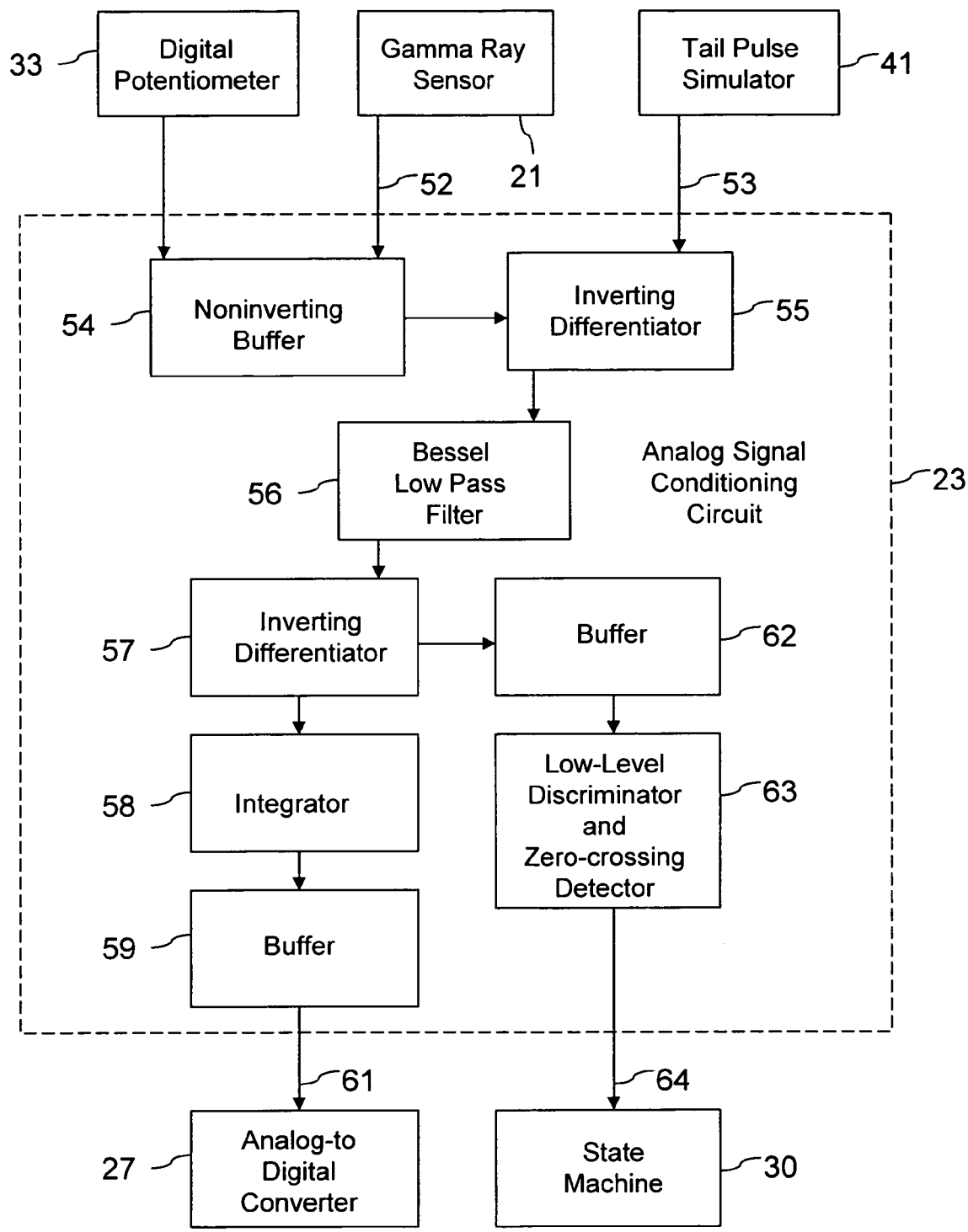
FIG. 2 is a schematic diagram of the analog signal conditioning circuit of the present invention.

Referring now to FIG. 2, a schematic diagram illustrates in greater detail the analog signal conditioning circuit 23. The inputs to the analog conditioning circuit 23 include tail pulses 52 from the gamma ray sensor 21 and the pulser signal 53 from the tail-pulse simulator circuit 41. The analog signal conditioning circuit 23 includes a plurality of operational amplifiers that shape the pulses with a non-inverting buffer circuit 54, inverting differentiator circuit 55, Bessel low-pass filter circuit 56, inverting differentiator 57, integrator circuit 58 and buffer circuit 59. An output 61 of the buffer circuit 59 is applied to the analog-to-digital converter 27. The analog conditioning circuit 23 also includes a buffer circuit 62 which functions as a buffer and comparator circuit 63 which functions as a low level discriminator and zero-crossing detector. An output 64 of comparator circuit 63 is applied to the state machine 30. From FIG. 2, it can be appreciated that the digital potentiometer 33 is used to adjust the gain of analog conditioning circuit 23.

Figure 3:
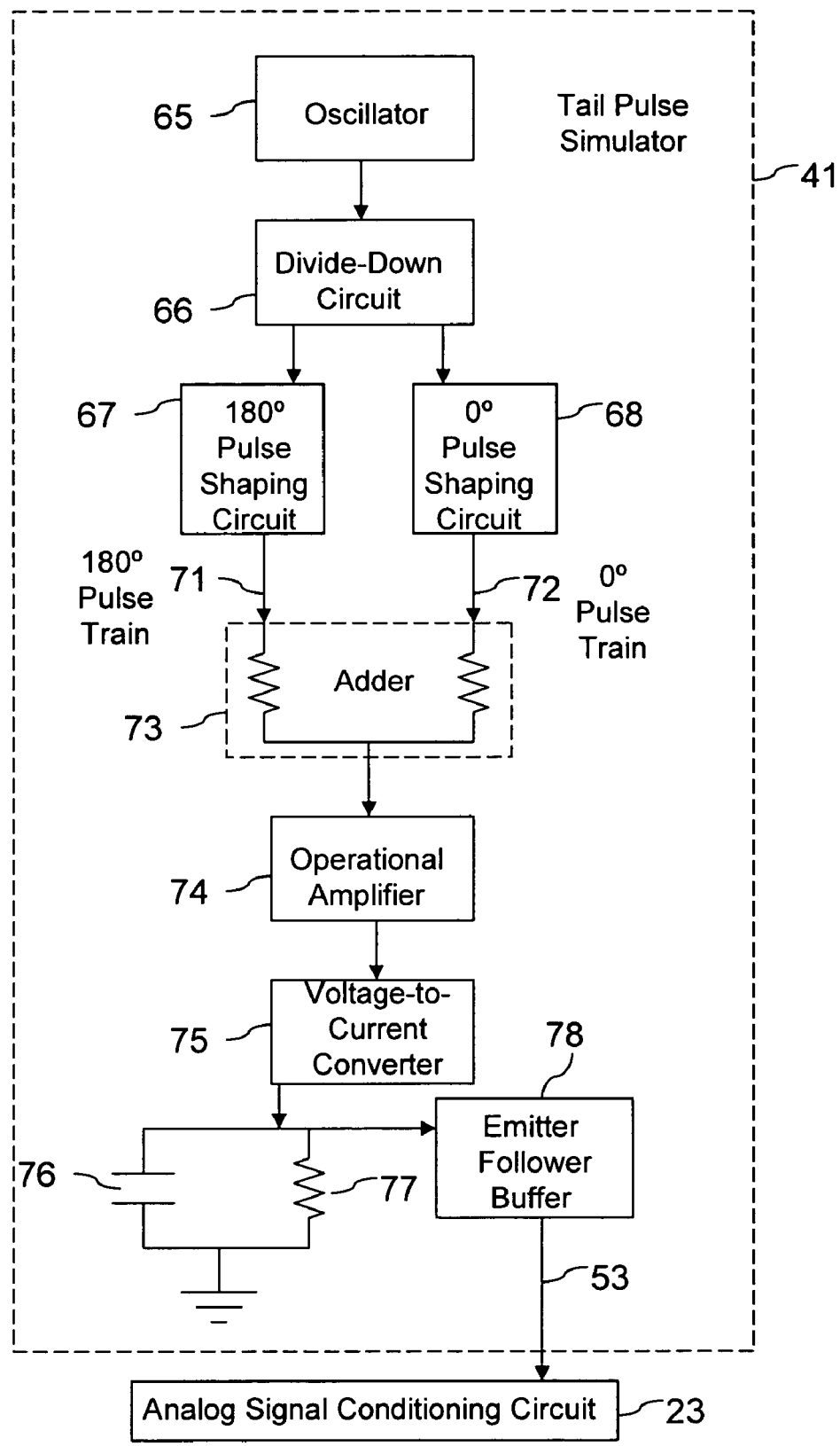
FIG. 3 is a schematic diagram of a tail-pulse simulator circuit for generating simulated tail pulses.

Referring now to FIG. 3, a schematic diagram illustrates a tail-pulse simulator circuit 41 that generates a signal that simulates a tail pulse from a radioactive source. The output of tail-pulse simulator circuit 41 is a tail-pulse simulator signal or pulser signal 53 that is input to the analog signal conditioning circuit 23. The circuit 41 includes a crystal oscillator 65 that generates a pulse train. The divide down circuit 66 divides the pulse repetition rate of the pulse train in order to provide the desired pulse repetition rate. These pulses and the oscillator signal are applied to zero-degree 67 and 180-degree 68 pulse shaping circuits, and the outputs of the pulse-shaping circuits appear at points 71 and 72 as two pulse trains that include relatively narrow pulses 180° out of phase. The two out-of-phase pulse trains are applied to an adder 73 and to operational amplifier 74. The output of the operational amplifier 74 is a single pulse train having a fixed intensity ratio that is applied to a voltage-to-current converter circuit 75. The voltage-to-current converter circuit 75 converts the voltage pulses into current pulses. The current pulses charge up capacitor 76 that is discharged across the resistor 77, and the discharged current is applied to a transistor which functions as an emitter follower buffer 78. The output of the buffer is the pulser signal 53. The pulser signal 53 simulates the tail pulses from a gamma ray detector 21 of FIG. 2, and these simulated pulses are input to the analog conditioning circuit 23. The intensity ratio of the simulated pulses are precisely controlled. It is desirable for the two different fixed pulse intensities have an intensity ratio controlled to no more than ±1% variation over the temperature range of −25 deg. C. to +50 deg. C. Improved performance results when the variation is no more than ±0.3% For example, in some embodiments it is desirable that the variation be no greater than one channel width in a multi-channel detection system. In some embodiments the two different fixed pulse intensities are chosen to have an intensity ratio that is an integer value, where an integer value is defined to be a number that is within 0.3% of an integer number according to the standard mathematical definition of an integer.

The functions of the hardware and the associated software of FIG. 1 of the present invention will now be explained in more detail. Analog signals associated with the gamma ray "tail pulses" from the gamma ray sensor 21 are processed to generate bipolar shaped pulses. The analog conditioning circuit 23 integrates the shaped pulses to determine the area of the pulse. The analog-to-digital converter 27 converts the integrated signal to a digital signal. The offset is stabilized with the use of the on-board pulser or tail-pulse simulator circuit 41 of FIG. 3, as discussed below. The gain is computed based on the location of a gamma ray emitted by the natural background isotope $^{40}$K. Pile up rejection circuitry inhibits processing of signals from overlapping gamma ray pulses. A dead-time counter within the computer 22 determines the amount of time the circuit is busy processing signals verses the elapsed time.

The hardware of the present invention supports offset stabilization that operates in the following way. At periodic intervals, the processor of the computer 22 commands the hardware to enter offset stabilization mode. While in this mode, the gamma ray sensor 21 is disconnected and the tail-pulse simulator circuit 41 generates a series of current spikes at two amplitudes. The ratio of amplitudes is tightly controlled with less than 1% variation in some embodiments, but the absolute magnitudes are less important. The computer 22 then extrapolates from the peak amplitudes to determine the channel corresponding to the zero-amplitude intercept, and the electronic offset potentiometer 33 is adjusted to set the offset to zero.

This approach to energy calibration eliminates the need for sources that are regulated as radioactive material. As described above, the hardware of FIG. 1 enables offset stabilization, so the offset can be assumed to be zero. Therefore, the gain is the parameter that is determined to complete the energy calibration. A wide variety of emissions can be used to determine the gain; in many embodiments it is convenient to use naturally occurring radioactive isotopes. For example, peaks such as those at 1460 keV or 2614 keV, which are associated with the naturally-occurring radioactive elements potassium and thorium, can be used to determine the gain. One suitable peak generally observed at 1460 keV is due to the naturally occurring isotope $^{40}$K, but in some sampling situations the naturally-occurring intensity may be too low for energy calibration purposes. In such cases, a supply of potassium chloride (which is a common substitute for sodium chloride dietary salt) can be placed near the detector. In some embodiments, the amount of potassium chloride used for calibration is on the order of a few hundred grams. Although it emits gamma rays, potassium chloride is legally declared to be non-radioactive because the activity is less than 70 Bq/gm. Therefore, in this embodiment, coupling the offset-stabilized multi-channel analyzer of this invention with gain stabilization based on gamma rays emitted by $^{40}$K allows energy calibration without using hazardous materials. The energy calibration process and analysis of the spectra following data collection are preformed on the computer.

The hardware of the present invention has several advantages over existing technology. The use of bipolar shaping results in a circuit that is simpler than other techniques, which facilitates inspection and allows for less expensive manufacturing.

The signal processing circuit in some embodiments operates in conjunction with software running on a CPU in a computer. In some embodiments, the computer is a modular computer system such as a PC-104 computer. The PC-104 architecture is one example of a modular system architecture that uses approximately 3.5" square boards that snap together. A PC-104 computer includes the same basic architecture as a stand-alone laptop or desktop computer running Windows or earlier DOS applications. The PC-104 computer architecture is widely used in industry, because of its "stack through" bus which uses ISA technology, and because it provides a compact and rugged design for building process control and embedded systems. PC-104+ systems include PCI-based boards instead of the older ISA based boards found in PC-104 systems. Other computer architectures can also be used in embodiments of this invention.

The circuit operates over a wide temperature range of −30° C. to +70° C. Commercial units are typically limited to the range 0° C. to +50° C. Since offset is stabilized electronically, it is only necessary to identify one gamma-ray peak in order to complete the energy calibration procedure. The isotope $^{40}$K in potassium chloride is suitable for this purpose. Other gamma-ray emitting materials and naturally occurring gamma radiation can also be used. The combination of offset stabilization and software supporting gain calibration using gamma rays from $^{40}$K enables spectroscopic analysis without requiring radiation sources that must be handled as hazardous material.

The preceding embodiments of present invention are described as a signal processing circuit for a nuclear sensor. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A nuclear sensor, comprising:
    a gamma-ray sensor for generating a tail pulse signal in response to a sensed gamma-ray pulse from a gamma-ray-emitting sample;
    a tail-pulse simulator circuit for generating a plurality of simulated tail pulse signals having at least two different fixed pulse intensities;
    an analog conditioning circuit for receiving and conditioning at a first time the tail-pulse signal, thereby generating a conditioned tail-pulse signal, and for receiving and conditioning at a second time the plurality of simulated tail pulse signals, thereby generating conditioned simulated tail-pulse signals, the analog conditioning circuit being functionally connected to provide digitized outputs to a computer for the conditioned tail-pulse signal and for the conditioned simulated tail-pulse signals, with the computer processing the conditioned tail-pulse signal to produce a measure of the sensed gamma-ray pulse and processing the conditioned simulated tail-pulse signals to generate a zero offset signal; and
    a digital control interface functionally connected between the computer and the analog conditioning circuit, with the digital control interface receiving the zero offset signal and using the zero offset signal to set a zero offset in the analog conditioning circuit.

2. The nuclear sensor according to claim 1, further comprising a digital potentiometer located between the digital control interface and the analog conditioning circuit, the digital potentiometer being used to set the zero offset for the analog conditioning circuit.

3. The nuclear sensor according to claim 1, wherein the first time and the second time are determined by the computer such that the analog conditioning circuit receives and conditions the tail-pulse signal or the plurality of simulated tail-pulse signals.

4. The nuclear sensor of claim 1, wherein the least two different fixed pulse intensities have an intensity ratio that varies no more than 1% over an operating range of temperature between 25° C. and 50° C.

5. The nuclear sensor of claim 1, wherein the at least two different fixed pulse intensities have an intensity ratio that varies no more than an intensity value equal to two channel widths in a multichannel detection system.

6. The nuclear sensor of claim 1, wherein the at least two different fixed pulse intensities have an intensity ratio that is an integer value.

7. A signal processing circuit for simulating a tail pulse signal, comprising:
    an oscillator for generating a pulse train;
    a circuit for generating two out-of-phase pulse trains from the pulse train generated by the oscillator; and
    a converter for converting the two out-of-phase pulse trains into a plurality of current pulses that simulate a plurality of tail pulse signals from a nuclear sensor.

8. The nuclear sensor processing circuit according to claim 7, wherein the oscillator is a crystal oscillator, wherein the circuit for generating the two out-of-phase pulse trains includes a plurality of flip flops, and wherein the converter includes a voltage-to-current device.

9. A method for simulating a tail pulse signal for a nuclear sensor, comprising the steps of:
    generating a pulse train;
    generating two out-of-phase pulse trains from the pulse train; and
    converting the two out-of-phase pulse trains into a plurality of current pulses that simulate the tail pulse signals from a nuclear sensor.

10. A method for calibrating a device for sensing nuclear samples, comprising the steps of:
    generating a plurality of tail pulse signals from a nuclear sample;
    generating a plurality of simulated tail pulse signals;
    conditioning the plurality of tail pulse signals to form a plurality of conditioned tail pulse signals;
    processing the plurality of conditioned tail pulses and the plurality of simulated tail pulse signals;
    adjusting the offset of the nuclear sensor with the simulated tail pulses; and
    adjusting a signal gain of the device for sensing nuclear samples using a radioactive sample.

11. The method according to claim 10, wherein the radioactive sample is a non-hazardous naturally occurring radioactive sample.

12. The method according to claim 10, wherein the radioactive sample is potassium chloride.

* * * * *